June 22, 1937.  T. MÜLLER ET AL  2,084,774
DIESEL MOTOR DRIVEN RAIL GUIDED VEHICLE
Filed Nov. 15, 1933  2 Sheets-Sheet 2
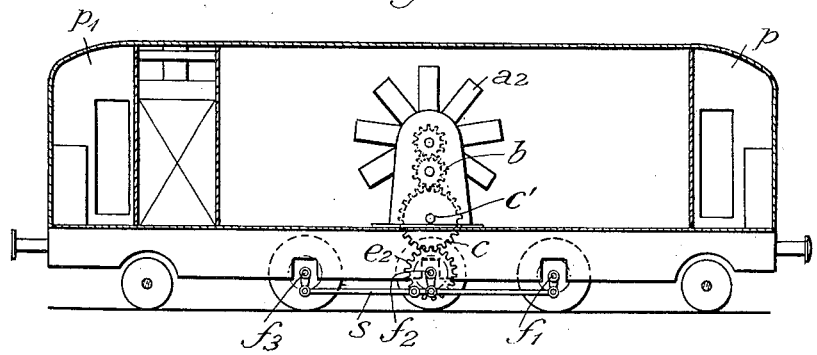
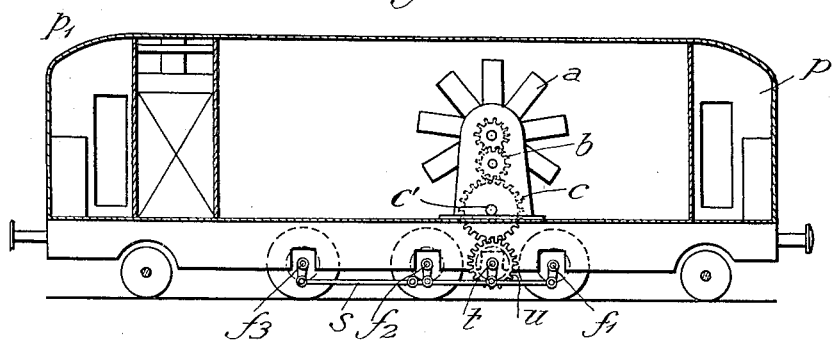
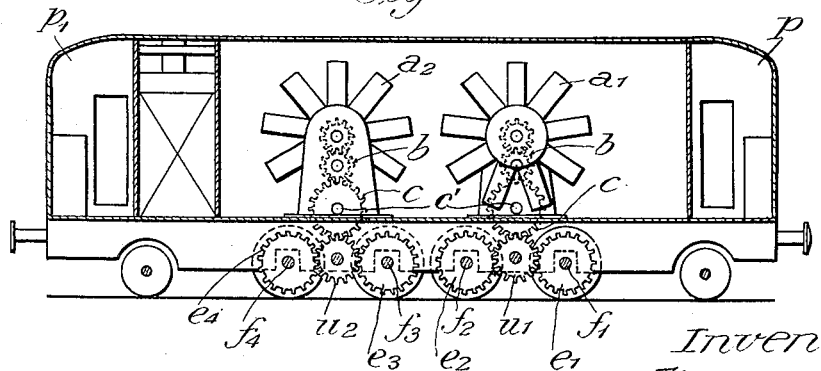
Inventors.
Theodor Müller
Hans Wiederkehr,
By Sommers & Young,
Attys.

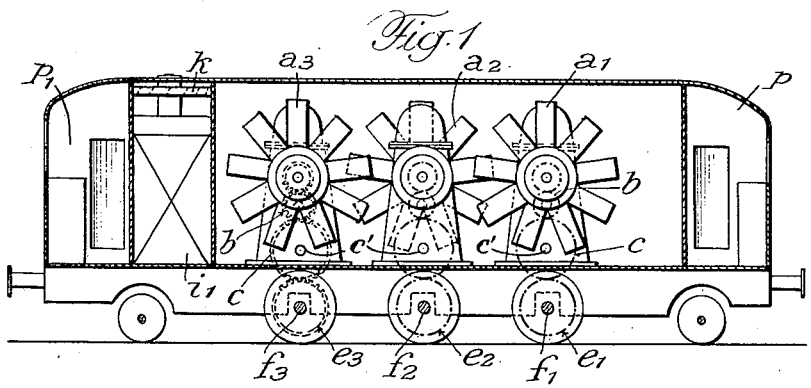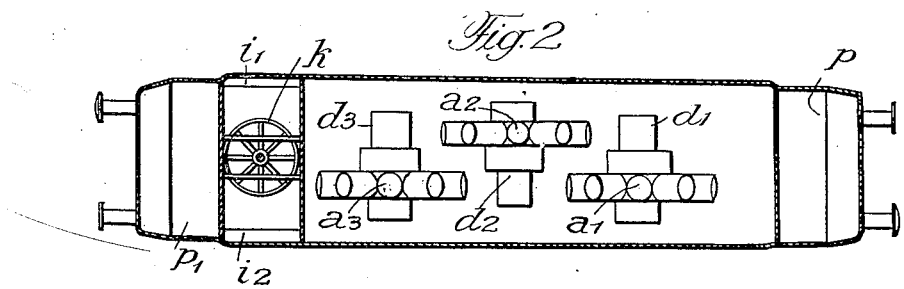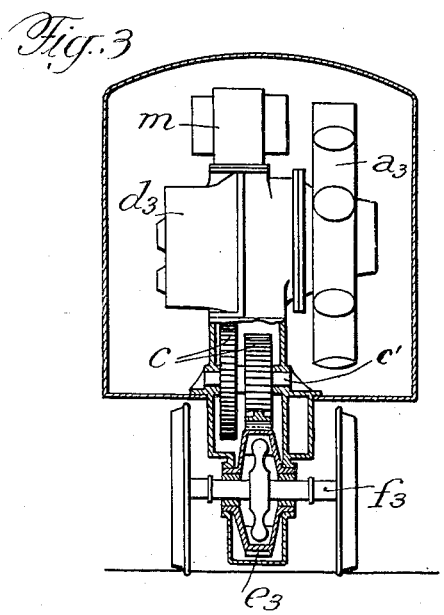

Patented June 22, 1937

2,084,774

UNITED STATES PATENT OFFICE 2,084,774

DIESEL-MOTOR DRIVEN RAIL-GUIDED VEHICLE

Theodor Müller, Winterthur, and Hans Wiederkehr, Zurich-Hongg, Switzerland, assignors to the firm Schweizerische Lokomotiv- & Maschinenfabrik, Winterthur, Switzerland Application November 15, 1933, Serial No. 698,172
In Germany February 19, 1932

8 Claims. (Cl. 105—62)

This invention relates to Diesel-motor driven rail guided vehicles.

In connection with rail guided motor driven vehicles, it is known, to drive one or more axles by a separate, for example a two-cylinder motor, by means of driving chains. It is also known, to equip a vehicle with one or more aggregates of Diesel-motor driven generators and to impart the drive to the axles by electromotors. With this arrangement, a single electromotor may be operatively connected with coupled axles of a bogie or else each individual axle is driven by one or two electromotors.

With Diesel-motor driven rail guided vehicles, particularly locomotives of great driving effort (for example 1500 horsepower and more), having mechanical power transmission means, considerable difficulties are encountered when the known line series cylinder motor is used with its crank shaft disposed parallel to the longitudinal axis of the vehicle. The mechanical transmission of the driving power of the motor to the driving axles requires the employment of an intervening bevel gear wheel drive which drives could hitherto not be applied for large power transmission in reliable manner. Moreover, line series cylinder motors together with the power transmission means associated therewith require considerable space and are very weighty, thus being improper for use in connection with various kinds of motor driven vehicles.

Diesel-motor actuated vehicles accommodating line series cylinder motors in transverse disposition have already been built, but this arrangement failed to be of equally high efficiency as others having the line series cylinder motors disposed parallel to the longitudinal axis of the vehicle. Furthermore, line series cylinder motors of a greater number of cylinders with the motor disposed transversely to the longitudinal axis of the vehicle can be arranged within the width afforded by the maximum allowable moving dimensions only with difficulty.

All these drawbacks are eliminated, according to this invention, by providing one or more radial cylinder Diesel-motors in a parallel disposition of their crank shafts to the driving axles. Each radial cylinder motor is operatively associated in coaxial relation with the primary part of the power transmission means, which part may be constituted by a spur gear wheel, or a change speed gear. The motor and said primary part are commonly mounted on a mounting member which is supported by the top members of the underframe of the vehicle above the top level of this frame, the motor being disposed substantially on one side of the vehicle and the primary part substantially on the opposite side thereof. Aside from a spur gear wheel, or change speed gear, the primary part of the power transmission means may consist in a hydraulic change speed gear or else the pump thereof. In the event of no change speed gear being required, the primary part may be in the form of a single spur gear pinion. Thus in every case the high speed portion of the transmission means forms the said primary part. Since with this arrangement the transmission of the torque to the driving axles can be effected by means of spur gear wheels, the bevel gear wheel drives are done away with. The advantages accruing from arranging radial cylinder Diesel engines with a driving arrangement in this manner are particularly appreciated when locomotives or other rail-guided vehicles of a high or even a maximum driving power per ton weight thereof are involved. The compact construction and the comparatively light weight of the motors obtains a driving power per driving axle up to the limit set by adhesive weight, i. e. 800 horsepower, particularly when, in a known manner, motors operating with pre-compressed charge are used. Moreover, the simple crank shaft of the cylinder motors is practically free of vibrations in distinction from the crank shaft having numerous bearings along its length of the line series cylinder motor.

With a view to minimizing the length between driving axles or the distance between motors respectively and thus to reduce the requirement of space in the longitudinal direction of the locomotive, the radial cylinder equipments are alternately positioned to the right and left of the longitudinal center line of the locomotive which disposition provides at the same time more equal distribution of the weight on both sides of the locomotive. For mountain railway or rack gear locomotives the application of Diesel-motors, particularly in combination with charging blowers, offers great advantages, as these locomotives require relatively little space and weigh a minimum per horsepower.

In the accompanying drawings constructional forms of an adhesion locomotive to which the invention is applied are schematically illustrated by way of example only in which Fig. 1 shows an elevation of the vehicle, Fig. 2 shows the same in plan view, Fig. 3 shows a sectional side elevation, on a larger scale, Fig. 4 shows in an elevation similar to Fig. 1 a modification of the vehicle, Fig. 5 shows in an elevation similar to Fig. 1 a second modification of the vehicle, Fig. 6 shows in an elevation similar to Fig. 1 a third modification of the vehicle.

The radial cylinder Diesel-motors $a_1$, $a_2$, $a_3$ actuate the correlated spur gear wheels $e_1$, $e_2$, $e_3$ through the intermediary of driving gears $d_1$, $d_2$, $d_3$. These driving gears include the spur gear wheels $b$ on the engine crank shafts and intermediate spur gears $c$ mounted on shafts $c'$ located above the frame of the vehicle body. The spur gear wheels $e_1$, $e_2$, and $e_3$ in turn are operatively connected with the correlated driving axles $f_1$, $f_2$, $f_3$ by means of single axle drives.

The cooling of the motors is effected by means of coolers $i_1$ and $i_2$ which are connected with a ventilator $k$. By $p$ and $p_1$ the driver's cabins are designated.

Each motor $a$ is associated, in a known manner, with a charging blower $m$ in order to raise the efficiency of the motors to approximately the double amount of a like motor operating without pre-compressed charge.

Alternatively, the driving gears $d_1$, $d_2$, $d_3$ may include trains of gear wheels adapted for changing the speed or they may include other suitable mechanical or hydraulic driving elements.

In the modification of the vehicle as shown in Fig. 4, a single Diesel-motor $a_2$ is employed for driving the three driving axles $f_1$ to $f_3$ of the vehicle which are coupled to each other by means of an operative connection comprising connecting rod $s$. The spur gear wheel $e_2$ on the middle driving axle is directly actuated by the motor through the intervening spur gear wheels $b$ and $c$, as previously described.

Fig. 5 illustrates a modification of the vehicle in which a lay shaft $t$ is used for transmitting the torque of a single Diesel-motor $a$ to the three driving axles $f_1$ to $f_3$ of the vehicle that are coupled to each other and to the lay shaft by means of an operative connection comprising connecting rod $s$. The lay shaft $t$ is actuated by the motor through a train of spur gear wheels $b$, $c$, $u$.

Fig. 6 depicts a fourth modification of the vehicle wherein two Diesel-motors $a_1$ and $a_2$ supply the energy for actuating the vehicle. The motors $a_1$ and $a_2$ each cooperates with two pairs of driving axles $f_1$ to $f_4$, carrying the spur gear wheels $e_1$ to $e_4$, through the intermediary of spur gear wheels $u_1$ and $u_2$, each meshing with the adjacent pairs of spur gear wheels $e_1$, $e_2$ and $e_3$, $e_4$ respectively, on the one hand and spur gear wheels $b$, $c$ on the other hand.

We do not limit ourselves to the particular size, shape, number or arrangement of parts as shown and described, all of which may be varied without going beyond the scope of our invention as shown, described and claimed.

What we claim is:

1. In a motor driven rail-guided vehicle particularly of a great driving power and having a body and a frame, a series of driving axles, radial cylinder Diesel engines each located on one side of the center of the body and each for independently actuating one of said axles, said engines being arranged above the vehicle frame within the vehicle body with their crank shafts extending parallel to said axles, said crank shafts having driving impulses applied thereto from the correlated surrounding sets of engine cylinders at equal acute angles apart at the center, and said sets being staggered as regards the longitudinal center line of the vehicle, and a driving arrangement intercalated between each crank shaft and the correlated driving axle with its primary portion arranged coaxial with the crankshaft within said body substantially on the side of the latter opposite to that on which the correlated engine is disposed, free access to said primary driving parts and said engines being thus provided together with a reduction in the weight of the vehicle relative to the driving power thereof.

2. In a motor driven rail-guided vehicle particularly of a great driving effort and having a body and a frame, in combination, a series of driving axles, a series of radial cylinder Diesel motors arranged on the vehicle frame above the top level thereof, each motor being located on one side of the longitudinal center line of the body, in correlation to one of said driving axles of said series, for driving each axle of said series independently of the others, each of said Diesel motors having a crank shaft in parallel relation to said axles, the radial cylinders of each motor being equally spaced around the correlated crank shaft to impart to said crank shaft an approximately uniform driving torque, a driving arrangement intercalated between each of said crank shafts and the correlated driving axle, a change speed gear constituting a primary part of said driving arrangement, and a common mounting member for said change speed gear and the radial cylinders of the correlated Diesel motor supported by said frame above said level thereof, for receiving said radial cylinders and said change speed gear in coaxial disposition substantially on opposite sides of the vehicle body.

3. In a motor driven rail-guided vehicle particularly of a great driving power having a body and a frame, axle driving means, radial cylinder internal combustion engine means for delivering the driving torque for the axle drive arranged entirely above the vehicle frame within the vehicle body with the axis of the torque delivering means extending parallel to the axis of said axle driving means, and the torque being applied to said torque delivering means in the form of driving impulses following each other at equal acute angles throughout the circumference thereof, and a driving arrangement intercalated between the said torque delivering means and axle driving means with the primary portion of said arrangement disposed coaxial with said torque delivering means substantially on the opposite side of the longitudinal centre line of said body from said torque delivering means, free access to said primary driving parts and said engine means being thus provided together with a reduction in the weight of the vehicle relative to the driving power thereof.

4. In a motor driven rail-guided vehicle having a body and a frame particularly of a great driving power, a series of driving axles, radial cylinder Diesel engines each located on one side of the longitudinal centre line of the body and each for independently actuating one of said axles, arranged entirely above the vehicle frame within the vehicle body with their crank shafts extending parallel to said axles, said crank shafts having the driving impulses applied thereto from the correlated surrounding sets of engine cylinders at equal acute angles throughout the circumference thereof, and a driving arrangement intercalated between each crank shaft and the correlated driving axle and having a primary portion disposed coaxial with the crank shaft substantially on the opposite side of said center line of said body from the correlated engine, said portions of said arrangements being situated within said body, free access to said primary driving portions and said engines being thus provided together with a reduction in the weight of the vehicle relative to the driving power thereof.

5. In a motor driven rail-guided vehicle particularly of a great driving power having a body and a frame, a series of driving axles, a radial cylinder Diesel engine located on one side of the longitudinal centre line of the body, for conjointly actuating said series of axles, arranged entirely above the vehicle frame within the vehicle body with its crank shaft extending parallel to said axles, said crank shaft having the driving impulses applied thereto from the surrounding engine cylinders at equal acute angles throughout the circumference thereof, a driving arrangement intercalated between said crank shaft and said driving axles, and a change speed gear constituting the primary part of said driving arrangement and being coaxially disposed with said crank shaft substantially on the opposite side of said center line of said body from said engine and situated within said body, free access to said change speed gear and said engine being thus provided together with a reduction in the weight of the vehicle relative to the driving power thereof.

6. In a motor driven rail-guided vehicle particularly of a great driving power having a body and a frame, a series of driving axles operatively connected to each other in individual pairs, radial cylinder Diesel engines, each located on one side of the longitudinal centre line of the body and each for independently actuating one of said pairs of axles, said engines being arranged within the vehicle body with their crank shafts entirely above the vehicle frame and extending parallel to said axles, said crank shafts having driving impulses applied thereto from the correlated surrounding sets of engine cylinders at equal acute angles throughout the circumference thereof, and a driving arrangement intercalated between each crank shaft and each pair of correlated driving axles, said driving arrangement having a primary portion disposed coaxial with the crank shaft substantially on the opposite side of said center line of said body from the correlated engine, said primary portions of said arrangements being situated within said body, free access to said primary driving parts and said engines being thus provided together with a reduction in the weight of the vehicle relative to the driving power thereof.

7. In a motor driven rail-guided vehicle particularly of a great driving power having a body and a frame, a series of driving axles, an operative connection between said axles, a radial cylinder Diesel engine on one side of the longitudinal center line of the body for conjointly actuating said series of axles, said engine being arranged within the vehicle body with its crank shaft entirely above the vehicle frame and extending parallel to said axles, said crank shaft having driving impulses applied thereto from the surrounding engine cylinders at equal acute angles throughout the circumference thereof, and a driving arrangement intercalated between said crank shaft and said operative connection, said driving arrangement having a primary portion disposed co-axial with the crank shaft substantially on the opposite side of said centre line of said body from said engine and situated within said body, free access to said primary driving parts and said engine being thus provided together with a reduction in the weight of the vehicle relative to the driving power thereof.

8. In a motor driven rail-guided vehicle particularly of a great driving power and having a body and a frame, a series of driving axles, a lay shaft mounted in the vehicle frame parallel to said axles, an operative connection between said lay shaft and said axles, a radial cylinder Diesel engine located on one side of the longitudinal center line of said body for conjointly actuating said series of axles, and arranged entirely above the vehicle frame within the vehicle body with its crank shaft extending parallel to said axles, said crank shaft having driving impulses applied thereto from the surrounding engine cylinders at equal acute angles throughout the circumference thereof, and a spur gear wheel driving arrangement intercalated between said crank shaft and said lay shaft, said driving arrangement having a primary portion disposed coaxial with the crankshaft substantially on the opposite side of said center line of said body from said engine and situated within said body, free access to said primary driving parts and said engine being thus provided together with a reduction in the weight of the vehicle relative to the driving power thereof.

THEODOR MÜLLER.
HANS WIEDERKEHR.